(No Model.)
T. A. EDISON.
PHONOGRAPH RECORDER.
No. 393,466. Patented Nov. 27, 1888.
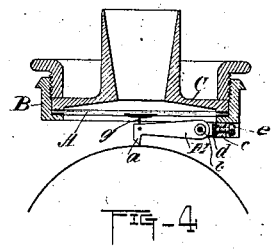
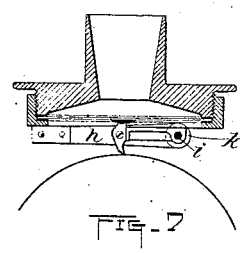
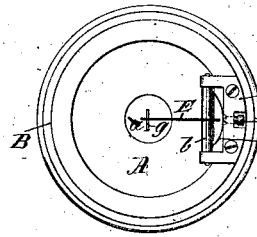
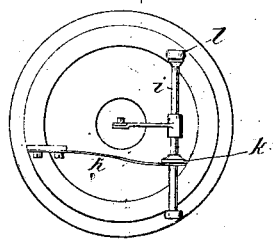
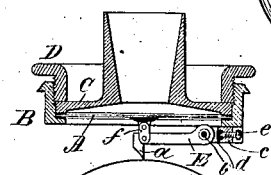
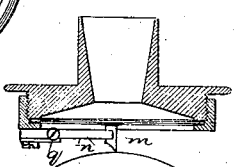
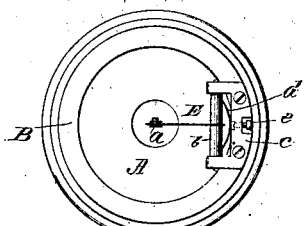
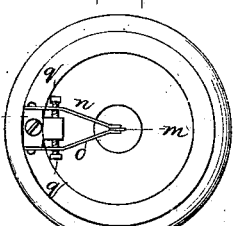
WITNESSES:
E. C. Rowland
William Pelzer
INVENTOR:
Thomas A. Edison
BY Dyer & Seely
ATTORNEYS

UNITED STATES PATENT OFFICE.

THOMAS A. EDISON, OF LLEWELLYN PARK, NEW JERSEY.

PHONOGRAPH-RECORDER.

SPECIFICATION forming part of Letters Patent No. 393,466, dated November 27, 1888.

Application filed July 17, 1888. Serial No. 280,207. (No model.)

*To all whom it may concern:*

Be it known that I, THOMAS A. EDISON, a citizen of the United States, residing at Llewellyn Park, in the county of Essex, in the State of New Jersey, have invented a certain new and useful Improvement in Phonograph-Recorders, (Case No. 789,) of which the following is a specification.

In experimenting with my phonograph I have discovered that imperfections are produced in the record made by the machine by reason of the momentum of the recorder-diaphragm and attached parts; also by reason of lost motion when the recording-point is mounted on a pivoted lever, as I prefer to mount it, and also by reason of the straining of the diaphragm, due to the attachment of the recording-point to such diaphragm, and due to the differences in the directions of movement of the recording-point and the diaphragm. These imperfections in the record become audible, as scratching and other foreign noises, when the sounds are reproduced.

The object I have in view is to overcome these defects in phonograph-recorders, with the result of making the reproduced sounds more clear, and also permitting the employment of a more sensitive reproducer.

In constructing my phonograph-recorder I make a positive connection between the diaphragm and the recording-point, so that there will be no loss of movement in communicating the vibrations of the diaphragm to the recording-point. The recording-point is mounted upon a rigid lever or arm which takes the lateral thrust of the recording-point and relieves the diaphragm from the strain due to said thrust. This rigid carrying-lever is also preferably a short lever, and is mounted to turn in bearings, so that the movement of the recording-point will be oblique to the recording-surface for the purpose of making the recording-waves more abrupt at one end than at the other.

In the preferred construction of my phonograph-recorder the lever carrying the recording-point is pivoted, as just stated, one or more of the pivotal bearings being friction-bearings having a considerable pressure exerted upon them, so that the movements of the lever, the recording-point, and the diaphragm will be retarded by the friction-bearings, thus overcoming the momentum of the parts. The lever is also made extremely light by making it from a thin plate, it having sufficient width to give the desired rigidity which is required to take the lateral thrust of the recording-point. The friction at the bearings of the pivotal lever is preferably obtained by means of a spring placed under tension, and this spring-tension is also preferably adjustable, so that the requisite amount of pressure can be obtained. The pressure of the spring on the bearings of the lever also serves to take up any lost motion. To prevent the positive attachment of the indenting-point with the diaphragm from straining the diaphragm, I make the connection one which is capable of yielding in the direction of the length of the carrying-lever. This connection is preferably a link pivoted to the lever, as well as to a block, cemented or otherwise secured to the diaphragm. Where the recording-point is supported directly from the diaphragm, no supporting lever or arm being employed, the retardation necessary to overcome the momentum may be produced by means of friction-springs which embrace the recording-point bearing against its opposite sides. This way of applying the friction may also be used when the recording-point is mounted upon an arm or lever. Instead of employing friction-springs for producing the retardation a dash-pot may be employed for the purpose. It will be seen that all these retarding devices are non-resilient and constant in their action and do not change the character of the vibrations of the diaphragm, which are given it by the sound-waves, but only serve to retard the movement and thus to overcome the momentum. The elastic or resilient dampening devices that have heretofore been used with diaphragms of phonographic apparatus produce quite a different effect from the non-resilient retarding devices, since by reason of their resiliency they change the character of the diaphragm vibrations and produce false movements which serve to injure rather than improve the character of the record.

In the accompanying drawings, forming a part hereof, Figure 1 is a vertical section of the preferred form of my recorder. Fig. 2 is a bottom view of the same. Fig. 3 is a vertical section of the recorder, showing a modification of the connection between the carrying-lever and the diaphragm. Fig. 4 is a bottom view of the recorder of Fig. 3. Fig. 5 is a section through the center of the diaphragm of the recorder of Figs. 3 and 4, showing in elevation the connection between the carrying-lever and the diaphragm. Fig. 6 is a vertical section of a recorder showing a modified way of producing the retarding-friction. Fig. 7 is a bottom view of the recorder of Fig. 6. Fig. 8 is a vertical section of a recorder having the recording-point supported from the diaphragm. Fig. 9 is a bottom view of the recorder of Fig. 8. Fig. 10 is a bottom view of a recorder having the recording-point supported by a lever and having the friction-springs bearing directly on the point; and Fig. 11 is a side view of a recorder showing the employment of a retarding dash-pot.

With reference to Figs. 1 and 2, which show the preferred form of my phonograph-recorder, the diaphragm A of my recorder is preferably a thin plate of microscope-glass which is clamped between plates B C by means of the adjusting-ring D, the edges of the glass diaphragm being protected by rubber rings. The recording-point $a$ is preferably mounted upon or forms part of a lever, E, which is made from thin plate metal in order to give it lightness. This lever E is mounted upon a long bearing-pin, $b$, which is pivoted in the ends of a yoke, $c$, secured rigidly to the bottom of the ring B. Between the back of yoke $c$ and the bearing-pin $b$ is a semi-elliptical spring, $d$, which bears against the bearing-pin $b$ and is adjusted in its tension by means of a screw, $e$, passing through the back of the yoke and setting against the center of the spring. The lever E is connected with the center of the diaphragm by means of a link, $f$, which is pivoted to the lever and is also pivoted to a small metal block which is cemented to the center of the diaphragm.

The tension of the spring $d$ produces considerable friction at the bearings of the pin $b$, and hence the movements of the diaphragm, the recording-point, and the carrying-lever are retarded by this friction, and the momentum of these parts is thereby overcome. All lost motion at the bearings is also taken up by means of the tension of this spring. The pivoted link $f$ forms a positive connection between the recording-point and the diaphragm, so that the movements of the diaphragm are communicated positively to the recording-point. At the same time this link $f$ is yielding in the direction of the length of the carrying-lever, so that the diaphragm will not be strained by the difference in direction of movement of the recording-point and the diaphragm. This positive connection, which is yielding at right angles to the direction of movement of the diaphragm, also prevents the straining of the diaphragm, which would be due to cementing a rigid attachment to it. It will be seen that if the link $f$ were rigidly connected with the lever E the effect would be to strain the diaphragm in cementing this rigid connection to it, since the diaphragm would be pressed in by the link in securing the cement, and when it resumed its normal position there would be a strain between the diaphragm and the connection.

In Figs. 3, 4, and 5 is shown the same instrument as that just described in connection with Figs. 1 and 2, with the exception that the link $f$ is supplanted by an arch, $g$, of wire, which is cemented at two points to the diaphragm and passes through the end of the lever E. This arch is practically rigid in the direction of the movement of the diaphragm, thus forming a positive connection between the diaphragm and the recording-point, while in is capable of yielding in the direction of the length of the lever E, thus preventing the strain of the diaphragm.

In Figs. 6 and 7 the friction is produced by means of a spring, $h$, which is secured to one side of the bottom of the ring B. It crosses such ring and has a forked end which embraces the long bearing-pin $i$, and bears with considerable pressure against a friction-disk, $k$, upon such bearing-pin. This pressure of the spring on the disk $k$ forces the bearing-pin $i$ longitudinally against its bearing $l$ at one end, which may be provided with a friction-washer of leather or other suitable material. In this recorder the recording-point is shown as directly connected with the diaphragm by cement, which construction may be employed, but is not as efficient as the yielding positive connection before described.

In Figs. 8 and 9 is shown a recorder having the recording-point $m$ supported directly by the diaphragm, there being no lever or arm to take the lateral thrust. The retardation is produced by means of two friction-springs, $n$ $o$, which are secured to a block, $p$, attached to the ring B of the recorder, and embrace at their inner end the recording-point $m$, upon the opposite sides of which they bear with considerable pressure, so that the recording-point in moving will be retarded by the friction of the springs on its sides. Adjusting-screws $q$ may be used to adjust the pressure of these friction-springs. The same way of producing the friction may be employed with recording-points mounted upon levers, as shown in Fig. 10. This form does not take up the lost motion at the pivots of the lever; but the friction being applied directly to the recording-point the retarding action is effectively produced.

In Fig. 11 a small dash-pot, $r$, connected with the outer end of the lever carrying the recording-point, is employed to retard the momentum of the parts.

As before stated, it will be observed that all the retarding devices are non-resilient in their action and afford a constant resistance to the movement of the parts at every point, in this respect differing widely from the dampening devices that have been heretofore employed.

What I claim as my invention is—

1. In phonograph-recorders, the combination, with the diaphragm, of the recording-point connected therewith, and a non-resilient retarding device for overcoming the momentum of the diaphragm and attached parts by constantly retarding the movement in both directions, substantially as set forth.

2. In phonograph-recorders, the combination, with the diaphragm, of the recording-point attached thereto, a lever or arm by which said recording-point is carried, and a non-resilient retarding device for overcoming the momentum of the diaphragm and attached parts by constantly retarding the movement in both directions, substantially as set forth.

3. In phonograph-recorders, the combination, with the diaphragm, of the recording-point connected thereto, and a pivoted lever carrying such recording-point and having one or more friction-bearings, substantially as set forth.

4. In phonograph-recorders, the combination, with the diaphragm, of the recording-point connected thereto, a pivoted lever carrying said recording-point, and a spring producing friction at the bearings of the lever and taking up the lost motion, substantially as set forth.

5. In phonograph-recorders, the combination, with the diaphragm, of the recording-point connected thereto, a pivoted lever carrying the recording-point, and an adjustable spring-friction exerted upon said lever, substantially as set forth.

6. In phonograph-recorders, the combination, with the diaphragm, of the recording-point, a lever or arm carrying such recording-point, and a positive connection between the recording-point and the diaphragm, such connection being constructed to yield in the direction of the length of the carrying-lever, substantially as set forth.

7. In phonograph-recorders, the combination, with the diaphragm, of the pivoted lever carrying the recording-point, and the link connecting such lever with the diaphragm and pivoted at both ends, substantially as set forth.

This specification signed and witnessed this 14th day of July, 1888.

THOS. A. EDISON.

Witnesses:
WILLIAM PELZER,
A. W. KIDDLE.